(12) United States Patent
Wiedenmann et al.

(10) Patent No.: US 10,670,855 B2
(45) Date of Patent: Jun. 2, 2020

(54) METHOD AND APPARATUS FOR IMAGING THE INNER CONTOUR OF A TUBE

(71) Applicant: SCHOTT AG, Mainz (DE)

(72) Inventors: Hans Wiedenmann, Waldsassen (DE); André Witzmann, Waldershof (DE)

(73) Assignee: SCHOTT AG, Mainz (DE)

( * ) Notice: Subject to any disclaimer, the term of this patent is extended or adjusted under 35 U.S.C. 154(b) by 117 days.

(21) Appl. No.: 15/693,670

(22) Filed: Sep. 1, 2017

(65) Prior Publication Data
US 2018/0059401 A1    Mar. 1, 2018

(30) Foreign Application Priority Data
Sep. 1, 2016 (DE) ................. 10 2016 216 568

(51) Int. Cl.
| | | |
|---|---|---|
| *G02B 23/24* | (2006.01) | |
| *G01B 11/24* | (2006.01) | |
| *G01B 11/12* | (2006.01) | |
| *G02B 27/28* | (2006.01) | |
| *G02B 23/04* | (2006.01) | |
| *G02B 23/02* | (2006.01) | |
| *G01N 21/954* | (2006.01) | |

(52) U.S. Cl.
CPC .......... *G02B 23/2461* (2013.01); *G01B 11/12* (2013.01); *G01B 11/24* (2013.01); *G01N 21/954* (2013.01); *G02B 23/02* (2013.01); *G02B 23/04* (2013.01); *G02B 27/288* (2013.01); *G01N 2021/9548* (2013.01); *G01N 2201/0683* (2013.01)

(58) Field of Classification Search
CPC ....... G01N 21/8806; G01N 2201/0642; A61N 5/062; G02B 23/2461; G02B 23/2423; G02B 27/283; G02B 6/4298; G02F 1/13362; G11B 7/1365; G11B 7/1395; G11B 7/1353; G11B 2007/0006; G11B 7/1378; G11B 7/1381; G11B 7/1356; G11B 7/1275; G11B 7/123; G03B 21/2066; G03B 21/2033; Y10S 385/901; H04N 9/3161
USPC .................................. 348/61–161, 180–194
See application file for complete search history.

(56) References Cited

U.S. PATENT DOCUMENTS

| | | | |
|---|---|---|---|
| 5,541,419 A | 7/1996 | Arackellian | |
| 7,636,204 B1 * | 12/2009 | Bourget | E21B 47/0002 356/241.5 |

(Continued)

FOREIGN PATENT DOCUMENTS

| | | |
|---|---|---|
| DE | 19510257 | 9/1995 |
| DE | 19908623 | 5/2000 |

(Continued)

*Primary Examiner* — Hung Q Dang
(74) *Attorney, Agent, or Firm* — Ohlandt, Greeley, Ruggiero & Perle, L.L.P.

(57) ABSTRACT

An apparatus and to a method for imaging the inner contour of a tube are provided. The method includes radiating light having a first polarization direction onto a first tube end in the longitudinal direction of the tube; reflecting the light downstream of a second tube end, wherein the light that is returning through the tube due to the reflection has a second polarization direction that is orthogonal with respect to the first polarization direction; and filtering the returning light with a polarization filter to transmit only the returning light.

22 Claims, 1 Drawing Sheet

(56) References Cited

U.S. PATENT DOCUMENTS

| | | | |
|---|---|---|---|
| 2006/0056786 A1* | 3/2006 | Yasuda | C08F 2/44 385/124 |
| 2008/0191051 A1* | 8/2008 | Faubel | B05B 1/00 239/8 |
| 2013/0308131 A1 | 11/2013 | Barak | |
| 2014/0347678 A1 | 11/2014 | Leconte | |
| 2015/0229887 A1* | 8/2015 | Kisner | G02B 23/2461 348/84 |

FOREIGN PATENT DOCUMENTS

| | | |
|---|---|---|
| DE | 102009015627 | 10/2010 |
| WO | 2013021137 | 2/2013 |

\* cited by examiner

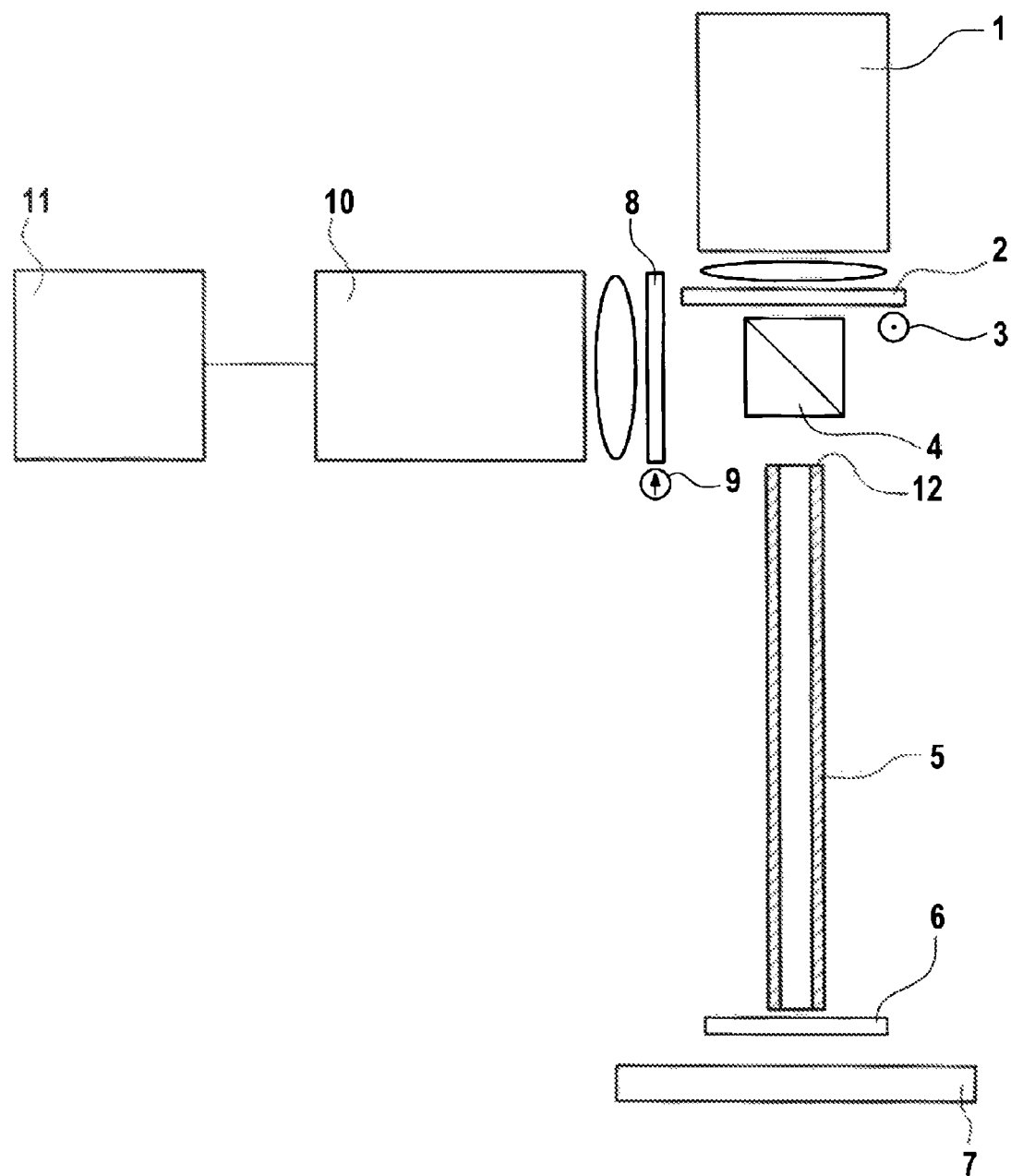

METHOD AND APPARATUS FOR IMAGING THE INNER CONTOUR OF A TUBE

CROSS REFERENCE TO RELATED APPLICATIONS

This application claims benefit under 35 U.S.C. § 119(a) of German Patent Application No. 10 2016 216 568.2 filed Sep. 1, 2016, the entire contents of which are incorporated herein by reference.

BACKGROUND

1. Field of the Invention

The invention relates to a method and an apparatus for imaging the inner contour of a tube.

2. Description of Related Art

One important quality criterion of a tube is its inside diameter tolerance. For example, inside diameter tolerances in the range of e.g. ±0.02 mm must be observed for capillaries and tubes for technical thermometers. In precision glass tubes, e.g. for use as sample carriers for magnetic resonance examinations, tolerances that are even substantially narrower in the micrometre range are required. In the field of pharmaceutical packaging made of glass, a narrow tolerance must be observed, since this has a direct influence on the dosing accuracy of the packaged medicament.

DE 199 08 623 A1 discloses a method for producing precision glass tubes on the basis of a continuous tube drawing method. In order to achieve the required final dimension and the low tolerances, both the outside diameter and the inside diameter of the drawn glass tube are measured continuously, at least at one measurement point radially with respect to the drawing direction. The measurement values are compared to the predetermined specified values of the precision glass tube. A laser measurement method is used to ascertain the measurement values.

DE 10 2009 015 627 A1 discloses a method and an apparatus for determining inside diameters, outside diameters and a wall thickness of transparent rotationally symmetric bodies. Here, light from a line light source is radiated laterally parallel with respect to the axis of rotational symmetry of the body and is detected likewise laterally using a receiving optical unit for measuring the inner contour.

Against this, the invention is based on the object of providing an improved method which permits the measurement of the inside diameter of a tube. The invention is furthermore based on the object of providing a corresponding apparatus.

SUMMARY

The method according to the invention for imaging the inner contour of a tube comprises at least the following steps: providing a tube; radiating light having a first polarization direction onto a first end of the provided tube in the longitudinal direction of the tube; reflecting the radiated light downstream of a second tube end, wherein the light that is returning through the tube due to the reflection has a second polarization direction that is orthogonal with respect to the first polarization direction; and filtering the returning light with a polarization filter to transmit only the returning light having the second polarization direction.

According to the invention, the term inner contour is understood to mean the profile of the inner edge of the tube at the front end thereof, on the basis of which tolerance deviations of the internal diameter can be determined. The longitudinal direction of the tube is defined according to the invention as the connection direction between the open ends thereof. If the tubes are in the form of hollow cylinders, the longitudinal axis corresponds to the cylinder axis.

In the method according to the invention, light having a first polarization direction is radiated onto a first tube end in the longitudinal direction thereof. The type of polarization and the direction thereof can here result from the use of a suitable polarization filter, or, specifically when using lasers, can be an inherent property of the light-emitting means used. The portion of the radiated light that is incident on the front end of the wall of the tube is partially reflected and partially transmitted.

The reflected component of the light is incident on a polarization filter that has a transmission polarization direction that is orthogonal with respect to the polarization direction of the radiated light. This polarization filter thus does not transmit the light that is reflected at the front end of the tube.

The component of light that is transmitted at the front end of the tube travels through the tube wall in the longitudinal direction and is attenuated in the process owing to absorption and/or scattering processes. The component of the radiated light that is incident on the internal cross section of the tube, on the other hand, travels through the tube in the longitudinal direction in substantially unattenuated fashion.

At the second end of the tube, the light exits the tube wall and the internal cross section of the tube, and is reflected back again downstream thereof. The polarization direction of the returning light has a second polarization direction which is orthogonal to the original polarization direction. The component of the light that is returning through the tube wall is attenuated further, while the light returning through the internal cross section of the tube once again exits the first end of the tube in a substantially unattenuated fashion. Here, like the light that was reflected at the front end, it is incident on the polarization filter, which transmits it owing to the prior change in polarization direction.

The light that is transmitted by the polarization filter thus substantially corresponds to that component of the radiated light that has travelled through the internal cross section of the tube. This light component thus images the inner contour of the tube and can be recorded by a receiver. It is then possible by way of the recorded inner contour to check whether the internal cross section of the tube lies within a specified tolerance range.

It is a particular advantage of the invention that a high contrast of the image can be achieved. This is owing to the fact that the component of the radiated light that is incident on the front end of the tube cannot pass, or only a very small component thereof can pass, through the second polarization filter. The reason therefore is that first, the polarization direction of the component of the light that is reflected at the front surface is not rotated and is therefore not transmitted by the polarization filter, and secondly, the component of the radiated light that is transmitted at the front surface is strongly attenuated by the wall of the tube in the forward and return directions.

It is furthermore particularly advantageous that the quality of the image of the inner contour is substantially independent of the quality of the tube cross-sectional area. In particular, a precise image of the inner contour can be achieved despite poor axial run-out conditions of the tube cross-sectional area, e.g. owing to breaking edges, shell cracks, sawing roughness etc.

Moreover, the tube acts like a hollow light guide. Since the reflection brings about a reversal in the direction of the light, the light after the reflection travels along nearly the same path back to the illuminated tube end that is located on the opposite side. As a result, the cross-sectional area to be investigated is illuminated very homogeneously as compared to a single passage of radiation. In particular, any bending of the tube or any non-coaxial illumination is hereby compensated.

A particular further advantage is that the present invention is suitable for imaging the inner contour both of tubes made of transparent material and also of tubes made of opaque material. For this reason, it is also suitable in particular for imaging the inner contour of tubes made of glass, independently of whether the glass is colourless, coloured, transparent or light-scattering, or whether its outside or inside has coatings. Other materials that are suitable for the present invention are, for example, plastics or metal.

The method according to the invention is suitable in particular for measuring tubes having a length of 0.5 m to 3 m, preferably 1 m to 2.5 m, with particular preference 1.4 m to 2 m. The inside diameters of such tubes are preferably between 2 mm and 100 mm, with particular preference between 5 mm and 50 mm. The ratio of tube length to inside diameter can here be between 10 and 1000, preferably between 20 and 500, with particular preference between 30 and 300.

An apparatus according to the invention for imaging the inner contour of a tube comprises at least means for providing a tube, means for radiating light having a first polarization direction onto a first tube end of the provided tube in the longitudinal direction of the tube, means for reflecting the radiated light downstream of a second tube end, wherein the light returning through the tube due to the reflection has a second polarization direction that is orthogonal with respect to the first polarization direction, and means for transmitting only the returning light having the second polarization direction.

According to a preferred embodiment of the invention, a narrowband light source, in particular a monochromatic light source, is used. Such light sources can preferably be light-emitting diodes (LEDs) or lasers. However, broadband light sources, such as incandescent lamps or gas discharge tubes, can also be used with a corresponding narrowband filter. Preferably, a telecentric light source which emits substantially parallel light beams is used.

According to a further preferred embodiment of the invention, the selected light is light having a wavelength at which, in particular in the case of transparent material, the extinction of the tube material is at a maximum. This has the advantage of particularly strong attenuation of the component of the light that travels through the tube wall. This is advantageous in particular for short tubes, because a shorter optical path length is available here for the attenuation.

According to a further preferred embodiment of the invention, the wavelength of the radiated light, in particular in the case of opaque material, is preferably chosen such that the reflectivity of the material has a maximum at the selected wavelength, since in this way the component of the light that is transmitted at the front face of the tube is minimized.

According to a further preferred embodiment of the invention, the type of polarization of the radiated light is linear polarization. The polarization direction of the returning light is then rotated by ±90° and is thus orthogonal with respect to the polarization direction of the radiated light.

Alternatively, the type of polarization can also be circular polarization. In this case, for example, the radiated light is left circularly polarized light and the returning light is right circularly polarized light, or vice versa. The polarization direction of the light that is returning through the tube is thus also orthogonal with respect to the original polarization direction in this case.

According to a further preferred embodiment of the invention, the radiation of the light is stroboscopic, for example in order to image the inner contour of tubes that move past on a conveying apparatus. In order to generate stroboscopic light, the light source preferably has a rotating sector diaphragm, an electronic drive or a Q-switch with which the intensity of the radiated light can be correspondingly modulated. Rotating sector diaphragms, also referred to as choppers, are particularly suitable for multiple purposes and can be used with any of the light-emitting means mentioned. An electronic drive is suitable specifically for the modulation of light-emitting or laser diodes. Q-switching is typically possible only when using lasers.

By way of example, each time a tube passes the measurement device, a short light pulse having a duration of e.g. one thousandth of a second is emitted for recording the inner contour of the tube that is moving past. The duration of the light pulse is here chosen in dependence on the speed of the conveyor belt, on the desired measurement accuracy, on the intensity of the light pulse, and possibly on the sensitivity of a receiver.

According to a further preferred embodiment of the invention, collimated light is used. This is advantageous in particular for long tubes, since a reduction in the intensity of the light that arrives at a receiver due to an enlargement of the cross-sectional area of the light beam is hereby avoided.

According to a further preferred embodiment of the invention, the radiated light passes, after its exit from the rear end of the tube, through an optical element both before and after the reflection, with the result that the light after its second passage through the optical element has a polarization direction that is orthogonal with respect to the original polarization direction. In the case of linearly polarized light, the reflected light, once it has passed twice through the optical element, is thus rotated by 90 degree in terms of its polarization direction. In the case of circularly polarized light, left-handed light is, for example, accordingly converted into right-handed light, or vice versa. A quarter-wave plate is preferably used as such an optical element. The working range of the quarter-wave plate is preferably matched to the frequency band of the used light.

According to a further preferred embodiment of the invention, a retroreflector that reflects light while maintaining its polarization direction is used to reflect the light. A retroreflector of this type, which preferably scatters the reflective light only weakly, leads to the light that is radiated in collimated fashion being weakly divergent after the reflection. As a result, dead zones which are caused e.g. by a bend of the tube are advantageously illuminated substantially homogeneously. A further advantage lies in the possibility of being able to implement large illumination apertures on account of the retroreflector.

According to a further preferred embodiment of the invention, a mirror is used instead of a retroreflector. This can be advantageous in particular for applications at high temperatures.

According to a further preferred embodiment of the invention, the light that is reflected at the front side of the wall of the tube and that returns through the tube is deflected, after it exits from the first end of the tube, in the direction of the polarization filter by way of a non-polarized beam splitter. The working range of the polarization filter is here preferably matched to the frequency band of the used light. This beam splitter is preferably a non-polarizing beam splitter plate, with particular preference a non-polarizing beam splitter cube.

According to a further preferred embodiment of the invention, a polarizing beam splitter is used instead of a non-polarizing beam splitter and a polarization filter. This advantageously reduces the total number of optical elements in the apparatus. This embodiment is also more favourable in terms of energy efficiency, because the light loss occurring in total is lower.

According to a further preferred embodiment of the invention, the returning light is recorded, after its passage through the polarization filter, using a receiver for recording the returning light. This receiver is preferably a telecentric receiver, for example a camera having a telecentric objective.

According to a further preferred embodiment of the invention, a narrowband filter for filtering extraneous light is used upstream of the receiver, the transmission range of which is preferably matched to the spectrum of the returning light. It is thus possible to further improve the signal-to-noise ratio of the image recorded in the receiver.

According to a further preferred embodiment of the invention, a check is carried out on the basis of the image as to whether the inner contour lies within a tolerance range, wherein the image is compared to a predefined contour. To this end, the apparatus has a unit, which is preferably connected to the receiver, for evaluating whether the imaged inner contour lies within this tolerance range.

A further advantage of the invention is the possibility of independently adjusting the illumination and the receiver. The present invention furthermore enables fast measurements with high precision.

BRIEF DESCRIPTION OF THE DRAWINGS

The sole FIGURE schematically illustrates an exemplary embodiment of an apparatus for imaging the inner contour of a tube.

DETAILED DESCRIPTION

The mode of operation of the invention will be explained below in more detail with reference to the drawing by way of a preferred embodiment. The FIGURE shows a principle illustration of an embodiment of an apparatus according to the invention.

The apparatus in the FIGURE comprises a telecentric light source (1). Arranged downstream of the telecentric light source (1) is a polarization filter (2) for linearly polarizing the light from the telecentric light source (1) that passes through the polarization filter (2) in the polarization direction (3) perpendicular to the drawing plane.

Located downstream of the polarization filter (2) is a non-polarizing beam splitter (4), which transmits a component of the incident light in the direction of the tube (5). Arranged downstream of the tube is a quarter-wave plate (6), the main axes of which are oriented at an angle of 45° with respect to the polarization plane of the light. This is followed by a retroreflector (7).

The component of the light that is reflected by the retroreflector (7) and reaches the beam splitter (4) is directed onto a polarization filter (8) by the beam splitter (4). The polarization filter (8) has a transmission polarization direction (9) which is perpendicular to the polarization direction (3) of the polarization filter (2).

Arranged downstream of the polarization filter (8) is a receiver (10), for example a camera having a telecentric optical assembly. The receiver (10) provides an image of the inner contour of the tube (5), which can be checked e.g. as to whether it observes the required tolerances using an evaluation unit (11). This may apply to carpules, for example, which move past a measurement apparatus according to the invention on a cross belt.

During operation of the apparatus shown in the FIGURE, first the tube (5) is brought into a measurement position between the beam splitter (4) and the quarter-wave plate (6). The telecentric light source (1) emits collimated light, which is polarized by the polarization filter (2) in the polarization direction (3). The wavelength of the collimated light is preferably chosen such that the attenuation of the light in the material of the wall of the tube (5) is particularly high. If the tube is made e.g. of clear glass, for example a wavelength in the infrared range, preferably a wavelength of greater than 1.5 μm, is selected. Depending on the tube material, the use of UV light or visible light can also be advantageous, for example.

A portion of the collimated and linearly polarized light reaches the tube (5) via the beam splitter (4). The component of the light that is incident on the front face (12) of the wall of the tube (5) is partially reflected at the front face (12) and partially transmitted. The component of the light that is reflected by the front face of the tube (5) reaches the polarization filter (8) via the beam splitter (4). Since the transmission polarization direction (9) of the polarization filter (8) is perpendicular to the polarization direction (3) of the polarization filter (2), this component of light is filtered out by the polarization filter (8).

The component of the light that is transmitted at the front face (12) of the wall of the tube travels through the tube (5) in the longitudinal direction within the wall and is attenuated in the process owing to scattering and extinction. The component of the transmitted light that reaches the opposite end of the tube (5) passes through the quarter-wave plate (6) and is circularly polarized in the process. Next, this component of the light is reflected at the retroreflector (7) and again passes through the quarter-wave plate (6). As a result, the light is again linearly polarized, wherein the resulting polarization direction is rotated by a total of 90° with respect to the original polarization direction, and thus corresponds to the transmission polarization direction (9).

This component of the light then travels through the wall of the tube (5) in the reverse direction and is attenuated further in the returning direction. Owing to the long optical path length through the tube (5) in the forward and return directions, this component of the light is attenuated so strongly that no, or hardly any, component of this light can reach the polarization filter (8) via the beam splitter (4). This is true in particular if the wavelength of the telecentric light source (1) has been selected such that as great an extinction as possible occurs.

The component of the collimated light that is incident on the internal cross section of the tube (5) passes through the tube (5) in substantially unattenuated fashion and is circularly polarized thereafter by the quarter-wave plate (6). Next, a reflection at the retroreflector (7) occurs while maintaining the polarization direction. After the retroreflection, this component of the light is again linearly polarized when it passes once more through the quarter-wave plate (6); due to the fact that the light passes twice through the quarter-wave plate (6), it is rotated by a total of 90° in terms of its polarization direction to the transmission polarization direction (9).

The light then travels through the internal cross section of the tube (5) in substantially unattenuated fashion once more back to the beam splitter (4), which directs it onto the polarization filter (8). Since the polarization direction has been rotated to the transmission polarization direction, this component of the light passes through the polarization filter (8) and reaches the receiver (10). Here, a high contrast and precise image of the inner contour of the tube (5) is formed as a consequence. This image is transmitted to the evaluation unit (11), which checks for example whether the internal cross section of the tube (5) is within the permitted tolerances.

It is of particular advantage when using a retroreflector (7) that a sharper image of the inner contour can be obtained even if the tube (5) is bent. This is because even dead zones caused by the bending of the tube (5) are illuminated substantially homogeneously due to the weak divergence of the radiated collimated light after the retroreflection.

It is furthermore also possible to use a polarizing beam splitter instead of the polarization filters (2) and (8) and the non-polarizing beam splitter.

The tube (5) can be located, for example, on a conveyor belt which moves at continuous speed. As soon as the tube (5) is located in the position, shown in the FIGURE, between the beam splitter (4) and the quarter-wave plate (6), the telecentric light source (1) is triggered and emits a short light pulse for recording the inner contour of the tube (5). As soon as the next tube on the conveyor belt moves past this measurement position, another light pulse is emitted for the next measurement. This process is then repeated for all tubes in the same way. Alternatively, illumination can also be continuous, and the receiver can be provided with a shutter, which opens only when a tube moves past the measurement position.

LIST OF REFERENCE SIGNS

| | |
|---|---|
| telecentric light source | 1 |
| polarization filter | 2 |
| polarization direction | 3 |
| beam splitter | 4 |
| tube | 5 |
| quarter-wave plate | 6 |
| retroreflector | 7 |
| polarization filter | 8 |
| transmission polarization direction | 9 |
| receiver | 10 |
| evaluation unit | 11 |
| front face | 12 |

What is claimed is:

1. A method for imaging the inner contour of a tube, comprising:
    providing a tube having a first face, a second face, and a longitudinal direction between the first and second faces;
    radiating light onto the first face, the radiated light having a first polarization direction, wherein the radiated light has a first component incident on the front first face that is partially reflected at the first face, a second component incident on the first face that is partially transmitted in the tube, and a third component incident on an internal cross section of the tube that is transmitted in the tube;
    passing the second and third components of the radiated light through the tube to the second face, wherein the second component is partially attenuated due to scattering and extinction and the third component is substantially unattenuated; and
    reflecting, at the second face, the second and third components of the radiated light so that reflected light is returned into the second face of the tube due to the reflection, the reflected light having a second polarization direction that is orthogonal with respect to the first polarization direction;
    passing the reflected light through the tube to the first face as returning light; and
    filtering, at the first face, the first component of the radiated light with a polarization filter to transmit only the returning light that has the second polarization direction.

2. The method according to claim 1, wherein the step of providing the tube comprises providing the tube made of a transparent or opaque material.

3. The method according to claim 1, wherein the step of providing the tube comprises providing the tube made of glass.

4. The method according to claim 1, wherein the step of providing the tube comprises providing the tube with a length of 0.5 m to 3 m, an inside diameter of 2 mm to 100 mm, and a ratio of the length to the inside diameter of between 10 and 1000.

5. The method according to claim 4, wherein the length is 1.4 m to 2 m, the inside diameter is between 5 mm and 50 mm, and the ratio is between 30 and 300.

6. The method according to claim 1, further comprising passing the second and third components of the radiated light through an optical element at the second face before and after the reflecting step so that the reflected light entering the second face has the second polarization direction.

7. The method according to claim 1, further comprising recording the portion of the returning light, wherein the step of recording comprises using a receiver for recording the portion of the returning light.

8. The method according to claim 7, wherein the returning light corresponds to the second and third components of the radiated light that have travelled through the internal cross section of the tube and so that the recording step provides an image of the inner contour of the tube.

9. The method according to claim 8, further comprising comparing the image to a tolerance range of the inner contour.

10. An apparatus for imaging an inner contour of a tube having a first face, a second face, and a longitudinal direction between the first and second faces, the apparatus comprising:
    a light source configured to radiate light in the longitudinal direction on to the first face, through the tube, and to the second face as radiated light, the radiated light having a first polarization direction;
    a reflector configured to reflect the radiated light at the second face onto the second face, through the tube, and to the first face as returning light, wherein the returning light has a second polarization direction that is orthogonal with respect to the first polarization direction; and
    a filter at the first face configured to transmit only the returning light having the second polarization direction and filter a component of the radiated light that is reflected by the first face.

11. The apparatus according to claim 10, wherein the light source comprises a telecentric light source.

12. The apparatus according to claim 10, wherein the light source comprises a light-emitting device selected from the group consisting of an incandescent light, a gas discharge tube, a light-emitting diode, a laser, and combinations thereof.

13. The apparatus according to claim 12, wherein the light-emitting device comprises an intensity modulator selected from the group consisting of a rotating sector diaphragm, an electronic drive, a Q-switch, and a polarization filter of the first polarization direction.

14. The apparatus according to claim 10, wherein the light source has a first polarization filter and the filter is a second polarization filter, wherein the first polarization filter is aligned in accordance with the first polarization direction, and the second polarization filter is aligned in accordance with the second polarization direction.

15. The apparatus according to claim 14, wherein the first and second polarization filters are filters linear polarization filters or circular polarization filters.

16. The apparatus according to claim 10, further comprising a beam splitter upstream of the first face, the beam splitter being aligned to direct the returning light onto the filter.

17. The apparatus according to claim 10, further comprising a quarter-wave plate arranged between the second face and the reflector.

18. The apparatus according to claim 10, wherein the reflector is a retroreflector or a mirror.

19. The apparatus according to claim 10, further comprising an optical narrowband filter downstream of filter having a transmission range matched to a spectrum of the returning light.

20. The apparatus according to claim 10, further comprising a receiver configured to record the returning light.

21. The apparatus according to claim 20, wherein the receiver is a telecentric receiver.

22. The apparatus according to claim 10, further comprising a unit configured to evaluate whether an imaged inner contour lies within a tolerance range.

* * * * *